Feb. 12, 1952     C. G. GERHOLD     2,585,238
METHOD AND APPARATUS FOR EFFECTING THE FLUIDIZED CATALYTIC
CONVERSION OF A REACTANT STREAM
Filed Oct. 23, 1948
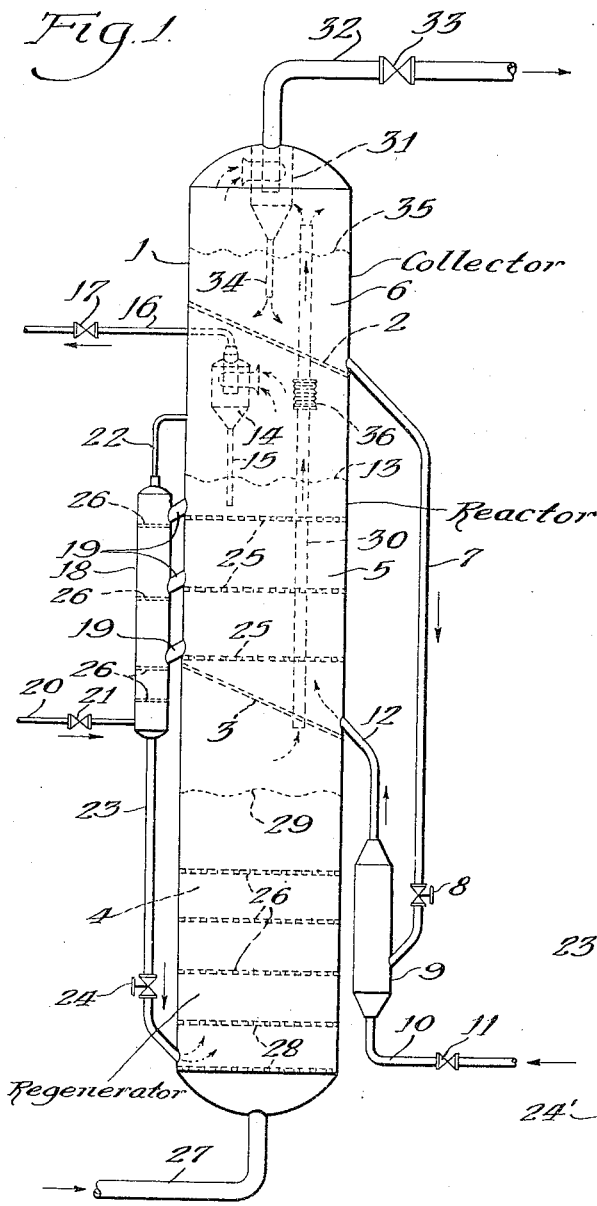
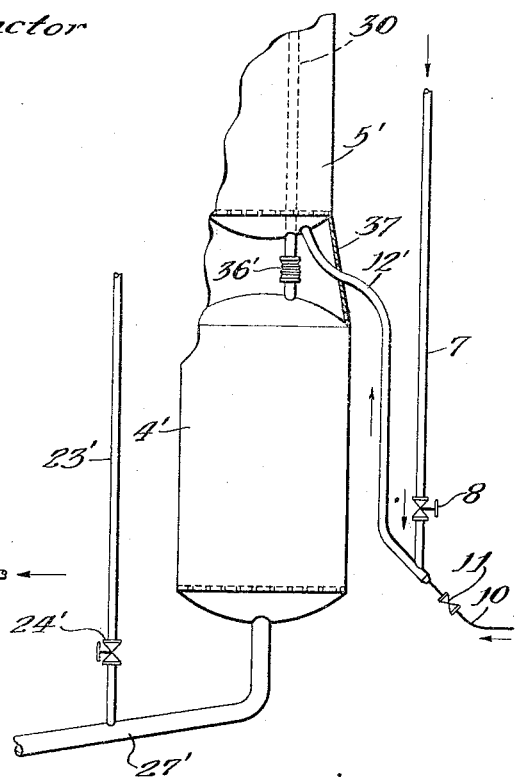
Inventor:
Clarence G. Gerhold
By: M. P. Venema
Attorney
Philip J. Liggett
Agent Patented Feb. 12, 1952

2,585,238

UNITED STATES PATENT OFFICE 2,585,238

METHOD AND APPARATUS FOR EFFECTING THE FLUIDIZED CATALYTIC CONVERSION OF A REACTANT STREAM

Clarence G. Gerhold, Riverside, Ill., assignor to Universal Oil Products Company, Chicago, Ill., a corporation of Delaware Application October 23, 1948, Serial No. 56,094

6 Claims. (Cl. 196—52)

This invention relates to a method and apparatus for effecting the fluidized catalytic conversion of a reactant stream, and more particularly to a fluidized operation which permits contacting the catalyst particles in a reaction zone maintained at a substantially higher pressure than that maintained within the catalyst regeneration zone.

The treatment of hydrocarbons and other organic streams in a fluidized catalytic type of operation is one which utilizes separate reaction and regeneration or reactivation zones for the continuous and simultaneous contacting of the catalyst particles, with means providing for their cyclic flow between the zones in a fluidized particle stream. The catalyst is used in a finely divided form, of either powdered or spherically manufactured material, and may be for example, a combination of silica and one or more metal oxides. The fluidized process for cracking and dehydrogenating organic compounds, particularly hydrocarbons, and the various types of commonly used catalysts such as silica-alumina, alumina-chromium oxide and alumina-molybdenum oxide compounds are now well known to the chemical and petroleum arts and need not be elaborated on here. There are however, certain disadvantages in the present types of commercial fluidized units, such as limitations in operating pressures within each of the contacting zones, long conduits, undesirable heat losses, etc., as the result of the construction and arrangement of the chambers.

It is therefore a principal object of the present invention to provide a fluidized catalytic conversion operation which allows a substantial difference in operating pressures between the reaction and the regenerating zones.

It is also an object of the present invention to provide a process flow and an arrangement of contacting zones which effects an upward concurrent flow of the gaseous stream and the catalyst particles in both the reactor and the regenerator.

It is still further an object of the present invention, to provide a unitary type of apparatus which is of compact construction and arrangement, having the contacting zones placed in a manner to effect an efficient continuous operation.

Additional objects and advantages of the improved flow and apparatus arrangement of this invention will be pointed out in subsequent sections of the specification in connection with the description of the unit. Broadly, the improved method of contacting sub-divided particles, or catalyst, in a fluidized process comprises, maintaining a lower contacting zone, an upper contacting zone, and a particle storage zone super-imposed above the latter, introducing sub-divided particles and a reactant stream to the lower end of the lower zone and passing the two concurrently upward in a fluidized bed of the particles, subsequently passing the contacted particles and the resulting gaseous stream concurrently together in a confined straight line path through the upper contacting zone to within the particle storage zone, discharging the resulting gases from the upper portion of the storage zone and withdrawing the contacted particles downwardly in a relatively dense compact column to a point below the lower end of the upper contacting zone, commingling a different stream of fluid with the thus withdrawn particles and introducing the mixture to the lower end of the upper contacting zone, passing the mixture concurrently upwardly through the upper contacting zone in a fluidized bed of particles and discharging resulting products from the top of this zone while withdrawing contacted particles from the fluidized bed therein and passing them downwardly in a relatively compact column to the lower contacting zone, whereby the thus withdrawn particles are commingled with the first mentioned reactant stream.

The arrangement of the contacting zones and the flow as provided by the present invention, thus effects a concurrent flow of the particles and gas stream in the lower contacting zone and a particle carry-over to an elevated zone, which is super-imposed above the upper contacting zone, whereby the particles may be collected into a relatively compact or dense phase state. A long standpipe extending from the lower end of the collecting zone to a point below the upper contacting zone and the resulting long column of particles provides means for introducing the particles into the charge stream entering that zone at a relatively high pressure. The flow in the upper contacting zone is also maintained in a manner providing a fluidized concurrently moving bed of gas and particles, with the resulting gaseous stream being subsequently discharged from the upper end of the zone and the particles withdrawn from the upper portion of the fluidized bed.

In a more specific embodiment of the invention, the improved method of operation provides the contacting of a hydrocarbon stream with sub-divided catalyst particles in a fluidized operation which permits maintaining the reaction zone at a substantially higher pressure than the regenerating zone, comprising, maintaining upper and lower contacting zones in vertical alignment with one another and a particle collecting zone positioned at an elevation above the upper contacting zone, separately introducing used catalyst particles and a stream containing oxygen to the lower end of the lower contacting zone and passing the two concurrently upward therethrough in a fluidized bed, subsequently passing contacted and regenerated particles and the resulting combustion gases from the upper end of the lower contacting zone in a confined straight line path through the upper contacting zone to the collecting zone being maintained thereabove, discharging the combustion gases from the collecting zone and passing the reactivated and regenerated particles downwardly in a compact column therefrom to a point below the lower end of the upper contacting zone commingling the catalyst particles from the downwardly moving column with a reactant stream and introducing the mixture to the lower end of the upper contacting zone at a pressure substantially higher than that maintained within the lower contacting zone, passing the mixture concurrently upward through the upper contacting zone in a fluidized bed and subsequently discharging resulting reaction products from the upper portion thereof, withdrawing the used and contacted catalyst particles from the top of the fluidized bed maintained in the upper contacting zone and passing them downwardly in a relatively compact column to the lower end of the lower contacting zone, whereby they become mixed with the aforesaid oxygen-containing stream to be introduced into the lower zone.

The advantage of maintaining a higher pressure reaction zone may be pointed out, for example, by noting that in the cracking of hydrocarbons and in the fractionation and recovery of the resulting products it is particularly desirable to recover many of the lighter gases and that as a result it is desirable to operate the gas recovery section of a unit at a relatively high pressure. Therefore, in order to reduce the expense required in compressing the gas stream passing to the recovery unit, it is desirable to pass the gas thereto at a pressure of the order of 2 to 5 atmospheres, which permits a substantial cut in the energy requirements of the compression section. Present types of fluidized catalytic cracking units are generally operated at a relatively low pressure, normally less than 30 pounds per square inch gauge, the cost of compressing the air or oxygen-containing stream for introduction into the regenerator being a principal factor in limiting the operating pressure of the fluid unit to a low limit.

In the improved arrangement and flow of particles of this unit, the elevated particle storage chamber and the long standpipe therefrom provide a suitable pressure head to permit passing the reactant stream to the contacting zone for conversion at a substantially high pressure. Thus, there is gained the advantage of passing the reaction products to the fractionating and gas recovery zones at a substantially high pressure, while continuing to operate the regeneration zone in the lower chamber at a relatively low pressure, and without expenditure of energy of expense for compression thereto. The operation of the gas recovery section, at a substantially high pressure is as hereinbefore noted, very desirable and where one or two stages of compression for the introduction of the gas stream thereto can be eliminated, is particularly advantageous in reducing the cost of compression.

A unitary apparatus, such as may be provided by the present invention is of particular advantage, particularly where each of the contacting zones and the particle collecting hopper are maintained in vertical alignment with one another, and form thereby a compact unit having a minimum form of supporting structure. Also, utilization of a straight, vertical open-ended conduit from the upper end of the lower contacting zone, through the upper contacting zone to the collecting hopper, is a desirable feature providing a direct transfer of catalyst particles. Where the lower contacting zone is utilized as a regenerator, hot regenerated and reactivated particles are transferred upwardly through this open-ended conduit in heat exchange relationship with the interior of the reaction zone, which is normally an endothermic zone utilizing the heat carried by the catalyst particles. The particle transfer or carry-over to the top collecting hopper is of course accomplished through the use of a high velocity gaseous stream passing upwardly through the transfer conduit, so that a straight vertical alignment of the pipe is desirable to eliminate unnecessary erosion therein as well as undesirable attrition of the catalyst particles.

The accompanying drawing and the following description thereof will serve to point out further advantageous features of the present invention.

Figure 1 of the drawing is a diagrammatic elevational view, indicating the improved flow and apparatus arrangement.

Figure 2 of the drawing is a partial elevational view of the lower portion of the unit, showing an alternate arrangement of the contacting chambers and the connecting transfer lines.

Referring now to Figure 1 of the drawing, there is shown a housing or chamber 1 having partitioning plates or diaphragms 2 and 3, which form separate confined contacting chambers, a lower contacting section 4, an upper contacting section 5, and a particle separating and collecting chamber 6. Each of the contacting sections are adapted to maintain fluidized beds of contact material, and in the following description it will be assumed that the contact material is a finely divided catalyst such as used for converting a hydrocarbon stream being continuously charged to the reaction zone. Further, that the section or contact zone 5 forms the conversion zone, while the lower section 4 is utilized as a regenerating and reactivation zone for the catalyst particles, and that the top section 6 provides a zone to separate combustion gases from the particles, whereby the reactivated catalyst particles may be collected in a relatively dense phase for their transfer to the reaction zone.

The regenerated catalyst particles descend from the upper collecting zone 6 in a compact column through line 7 and a control valve 8, to become commingled with the hydrocarbon reactant stream entering a mixing chamber or initial contacting zone 9 by way of line 10 and the control valve 11. In chamber 9, the hot catalyst particles mix with the reactant stream and pass upwardly in a fluidized phase through the top of chamber 9 and the conduit 12 to the lower end of the reaction zone 5, where they continue upward in a relatively dense fluidized bed within the reaction zone, the upper extremity being indicated by the broken line 13. The resulting conversion products and entrained catalyst particles enter a particle separator 14, which is indicated in the upper portion of the reaction zone 5. Recovered catalyst particles are returned to the fluidized contact bed through dipleg 15, while resulting reaction products, substantially free of catalyst, are discharged from the reaction zone through conduit 16 having control valve 17.

In the present embodiment, used catalyst particles are continuously withdrawn from the contact bed within the reaction section 5, through a stripping chamber 18 which is positioned adjacent to and connects with the reaction section. In a preferred operation, the catalyst particles are withdrawn from the upper portion of the fluidized bed, utilizing one of the interconnecting conduits 19. The used catalyst particles pass downwardly through the stripping zone chamber 18 countercurrently to a stripping medium passing upwardly therethrough and being introduced in this embodiment by way of line 20 having control valve 21. The density of the catalyst bed in the stripper may be maintained such that it is of somewhat higher particle density than that maintained within the reaction zone, whereby to substantially prevent flow of catalyst particles from the reaction zone to the stripper through the lower of the interconnecting conduits 19. The stripping medium charged through line 20 may be steam, nitrogen, flue gases, or other relatively inert medium suitable to remove occluded vaporous materials from the used catalyst particles. The stripping medium and removed gaseous matter at the top of the chamber 18 may pass into the upper portion of the reaction zone through a line 22 which connects therewith. Connecting with the lower end stripper 18 is a conduit or standpipe 23 having control valve 24 which provides the transfer of the used and stripped catalyst particles into the lower portion of the regenerating zone within the lower section of the unit. In a preferred apparatus embodiment, it is desirable to place perforated plates or grids 25 across the diameter of the reaction zone in order that redistribution of the gaseous particle streams may be effected and an efficient contact obtained. Likewise, it is desirable to place vertically spaced plates or grids across the stripping chamber 18 in order to provide efficient countercurrent distribution of the particles and gas streams passing through the stripping zone.

In the lower regenerating zone 4, the used catalyst particles being introduced through line 23 to the lower end of the chamber, are contacted and fluidized by air or an oxygen-containing stream being introduced through line 27 and are carried concurrently upwardly through the chamber in a fluidized bed. Spaced grid plates 28 are indicated across the lower chamber 4, in order to provide an efficient distribution of the air stream through the particle bed and to provide a desirable uniformly fluidized contact bed, the upper extremity of which is indicated by the broken line 29. The transfer of the resulting combustion gases and of the reactivated particles is effected from the upper end of the regenerating zone through an open-ended conduit 30, which extends through both the diaphragms 3 and 2 and terminates at the upper end of the particle collecting and separating section 6.

This upper confined zone 6 provides means for separating the combustion or flue gases from the particles, the gas stream entering the particle separator 31 and being discharged therefrom through line 32 and valve 33, to be subsequently transferred to the fractionating and gas recovery sections. Recovered catalyst particles are returned from the lower end of the particle separator 31, through dipleg 54 to the particle bed maintained within the lower portion of the particle collecting hopper. The upper extremity of the bed is indicated by the broken line 35. The hot regenerated particles within the collecting zone 6 are subsequently passed downwardly through the standpipe 7 to commingle with the reactant stream, as hereinbefore described.

The elevated zone 6 and the maintenance of a relatively compact bed of particles therein and a relatively high column of particles descending therefrom in the standpipe 7, provide at the lower end thereof a substantially high hydrostatic pressure, so that it is possible to discharge the particles into the chamber 9 against a substantially high pressure stream of hydrocarbons being introduced into the reaction zone. The velocity of the reactant stream should be sufficient to carry the particles concurrently upwardly through zone 9 to conduit 12 and through the principal reaction zone 5, while maintaining a fluidized and hindered settling bed within the reaction zone. With a relatively large diameter mixing or pretreating chamber 9, the separation of dense and light phase zones may be effected within the chamber itself, however the quantity and the velocity of the reactant stream may not be within a range providing a defined dense phase within the lower portion of the chamber 9. The increased velocity of the vaporous stream through conduit 12 will of course carry the catalyst particles in a rapid less dense phase to the lower end of the reaction zone section 5.

It is not intended to limit the improved flow of this invention to the use of a pretreating or mixing chamber such as 9, for as indicated in Figure 2 of the drawing, the standpipe 7 may discharge into the lower end of the transfer conduit 12' which in turn connects directly with the charge line 10 having valve 11. A high pressure hydrocarbon stream may thus be commingled with the hot catalyst particles and passed directly into the reaction zone within the section 5 of the unit. Figure 2 also shows an alternate arrangement of the unit which may be made, that of joining line 23' with conduit 27', whereby the used catalyst particles are commingled with the air or oxygen stream prior to their introduction into the lower regenerating zone 4.

In a preferred embodiment of the invention, an elongated unit and an elevated storage zone is utilized which provides a relatively long standpipe 7 which in turn permits introducing the reactant stream to the reaction zone at a pressure of the order of 50 to 75 pounds per square inch gauge pressure, and in turn permitting the passage of reaction product to the fractionating and recovery zones, not shown here, at a pressure to effect a more efficient and economical recovery of desired light products. At the same time, the pressure in the regenerating zone 4 is preferably maintained quite low, of the order of less than 30 pounds per square inch gauge, in order to permit an economical regenerating operation, as hereinbefore noted. The flow arrangement of the present unit also provides concurrent flow of reactant particle streams to each of the contacting zones and is particularly desirable to effect a rapid cyclic flow of particles throughout the apparatus. The distributing plates or grids in each of the principal contacting zones may be designed to provide a slight pressure drop therethrough, to insure that the flow stream is broken and redistributed, and as a result provide adequate contacting between the vaporous stream and the particles.

The separate confined sections of the contacting apparatus are, of course, provided with suitable insulating materials to conserve heat within the unit. The partitioning members 2 and 3 are insulated to prevent structural failure due to different temperature conditions. It may be further pointed out, that the partitioning members need not be straight as indicated in the drawing but may be dished partitions which may better withstand differential expansions from the varying high temperature conditions. The open-ended conduit 30 is provided with an expansion joint 36 that is capable of absorbing linear expansion of the conduit and permits attaching the conduit 30 to each of the partitioning members without setting up strains in them, or harming them from expansion thrusts.

Still further, the apparatus need not be limited to that shown in Figure 1 of the drawing, with respect to the use of partitioning members to provide separate confined sections within a single vessel or chamber 1. For example, Figure 2 of the drawing indicates that the lower section 4 and the upper reaction section 5 may be separate confined chambers 4' and 5', each having separate heads and the chamber 5' being supported on the upper end of chamber 4' by a suitable supporting skirt member 37. In like manner, the upper particle collecting section 6 may be a separate confined chamber supported above the reactor chamber by suitable supporting skirt or legs. In this latter embodiment, the transfer conduit 30 may have expansion joints placed between the separate chambers, such as the expansion joint 36' indicated between the chambers 4' and 5'. It is also within the scope of the present invention, to place the stripping section within the chamber 1, partitioned from the reaction section 5 by suitable means, and to discharge the stripped used catalyst particles directly into the regenerating zone by means of an internally positioned conduit. In addition, a stripping medium may be connected with the particle outlet at the lower end of the particle collecting zone 6 in order to strip occluded combustion gases which may be passed downwardly with the regenerated particles.

I claim as my invention:

1. A method for contacting sub-divided solid particles in a fluidized conversion operation, which comprises, maintaining a lower contacting zone, an upper contacting zone, and a particle storage zone superimposed above the latter, introducing sub-divided particles and a reactant stream to the lower end of said lower zone and passing the two concurrently upward in a fluidized contact, subsequently passing contacted particles and the resulting gaseous stream concurrently together in a confined straight line path through said upper contacting zone to said particle storage zone, discharging resulting gases therefrom and withdrawing the contacted particles downwardly in a compact column to a point below the lower end of said upper contacting zone, commingling a different stream of fluid with said withdrawn particles and introducing the suspension to the lower end of said upper contacting zone, passing the suspension concurrently upwardly through the upper contacting zone in a fluidized contacting bed and discharging resulting products from the top of this zone while withdrawing contacted particles from the top of said fluidized bed and passing them downwardly in a relatively compact column to the lower end of said lower contacting zone, whereby they are commingled with first mentioned reactant stream.

2. A method for contacting sub-divided solid particles with two different reactant streams and at substantially different pressures in separate contacting zones, which comprises, maintaining upper and lower contacting zones in vertical alignment with one another and a particle separating and collecting zone positioned at an elevation above the upper contacting zone, separately introducing particles and a reactant stream to the lower end of the lower contacting zone and passing the two concurrently upward therethrough in a fluidized bed, subsequently passing the contacted particles and the resulting gaseous stream from the upper end of the lower contacting zone in a confined straight line path through said upper contacting zone to said collecting zone, discharging the resulting gases therefrom and passing the contacted particles downwardly in a compact column to a point below the lower end of the upper contacting zone, commingling a different reactant stream with said withdrawn particles and introducing the mixture to the lower end of the upper contacting zone at a pressure substantially higher than that maintained within said lower contacting zone, passing the mixture concurrently upward through the upper contacting zone in a fluidized bed, discharging resulting gaseous products from the upper portion of said zone and withdrawing contacted particles from the fluidized bed maintained in said upper contacting zone and passing them downwardly in a relatively compact column to the lower end of said lower contacting zone whereby said particles become mixed with the first mentioned reactant stream.

3. A method for effecting the conversion of a hydrocarbonaceous reactant stream in a fluidized contact with subdivided catalyst particles, which comprises, maintaining a vertically disposed confined regenerating zone, a confined reaction zone superimposed above the latter and in vertical alignment therewith, and a particle separating and collecting zone positioned above said reaction zone in vertical alignment with both said regenerating and reaction zones, separately introducing spent catalyst particles and a free oxygen-containing stream to the lower end of the lower contacting zone, effecting the burning and removal of carbonaceous material from said catalyst particles in an upwardly moving fluidized bed of catalyst particles maintained in suspension by said oxygen-containing stream, subsequently passing regenerated catalyst particles in a more dilute suspension with resulting combustion gases from the upper end of the regenerating zone in a confined straight line path through said reaction zone to said collecting zone, discharging the resulting combustion gases from the upper end of said collecting zone and settling the hot regenerated catalyst in the lower portion thereof, continuously passing hot regenerated catalyst downwardly in a relatively dense compact column to a point below the lower end of the reaction zone, continuously mixing a regulated stream of the hot catalyst with said hydrocarbonaceous reactant stream and introducing the mixture to the lower end of said reaction zone at a pressure substantially greater than that maintained within said regenerating zone, effecting the contact of said catalyst and said reactant stream in an upwardly moving fluidized bed maintained within said reaction zone, discharging resulting conversion products from the upper portion of said reaction zone at a substantial superatmospheric pressure while continuously withdrawing contacted catalyst particles from said fluidized bed maintained within said reaction zone, subsequently passing said particles downwardly in a relatively compact column to said regenerating zone to become mixed with the aforesaid oxygen-containing stream therein.

4. The conversion method of claim 3 further characterized in that the maximum pressure maintained in said regenerating zone is less than 30 pounds per square inch gauge, and resulting conversion products from the upper end of said reaction zone are discharged at a pressure substantially greater than that maintained in said regenerating zone.

5. The process of claim 3 still further characterized in that the used catalyst particles from said reaction zone pass downwardly through a stripping zone maintained adjacent to and in communication with said reaction zone, said particles passing downwardly countercurrently to an inert stripping medium introduced to the lower end of said stripping zone, said stripped catalyst passing in the aforesaid relatively compact column to said regenerating zone while the stripping medium together with removed vaporous products passes to the upper portion of said reaction zone and being discharged therefrom with the reaction products.

6. A unitary apparatus for contacting subdivided solid particles in a conversion process, which comprises in combination, a vertically disposed elongated chamber having imperforate partitioning members providing a lower regenerating chamber, a reaction chamber superimposed above and in vertical alignment with said regenerating chamber, and a particle collecting and separating chamber superimposed and in vertical alignment with both aforesaid lower chambers, gas and particle inlets at the lower end of the regenerating chamber, vertically spaced perforate distributing grids extending across said regenerating chamber, an open-ended conduit extending vertically from the upper end of said regenerating chamber through said reaction chamber to the upper portion of the particle collecting chamber, pressure tight expansible means within said conduit permitting longitudinal expansion in said conduit, particle recovery and gas outlet means in the upper end of said particle collecting chamber, a particle transfer conduit connecting with the lower end of said collecting chamber and extending downwardly therefrom to a level below the lower end of said reaction chamber, a reactant stream inlet conduit connecting with the lower end of said reaction chamber and joined with the lower end of said particle transfer conduit, particle recovery and gas outlet means at the upper end of said reaction chamber, an elongated stripping chamber adjacent to and in communication with the interior of said reaction chamber, said stripping chamber being arranged to withdraw particles from said reaction chamber and pass them downwardly through a second particle transfer conduit, a stripping medium inlet at the lower end of said stripping chamber and a stripping medium outlet at the upper end thereof connecting with said reaction chamber, last said particle transfer conduit connecting the lower end of said stripping chamber with the aforesaid particle inlet means at the lower end of said regenerating chamber.

CLARENCE G. GERHOLD.

REFERENCES CITED

The following references are of record in the file of this patent:

UNITED STATES PATENTS

| Number | Name | Date |
|---|---|---|
| 2,304,128 | Thomas | Dec. 8, 1942 |
| 2,389,399 | Alther | Nov. 20, 1945 |
| 2,414,373 | Gerhold | Jan. 14, 1947 |
| 2,428,873 | Gunness et al. | Oct. 14, 1947 |
| 2,450,724 | Grote | Oct. 5, 1948 |
| 2,459,824 | Leffer | Jan. 25, 1949 |
| 2,488,033 | Johnson | Nov. 15, 1949 |

OTHER REFERENCES

Bland Petroleum Processing—Sept., 1947, drawing page 672.